May 2, 1950 R. F. SYMONDS 2,506,397
WINCH WITH FRICTION CLUTCH
Filed June 19, 1945 2 Sheets-Sheet 1

INVENTOR
Ralph F. Symonds.
BY Kenway & Witter
ATTORNEY

May 2, 1950 — R. F. SYMONDS — 2,506,397
WINCH WITH FRICTION CLUTCH
Filed June 19, 1945 — 2 Sheets-Sheet 2
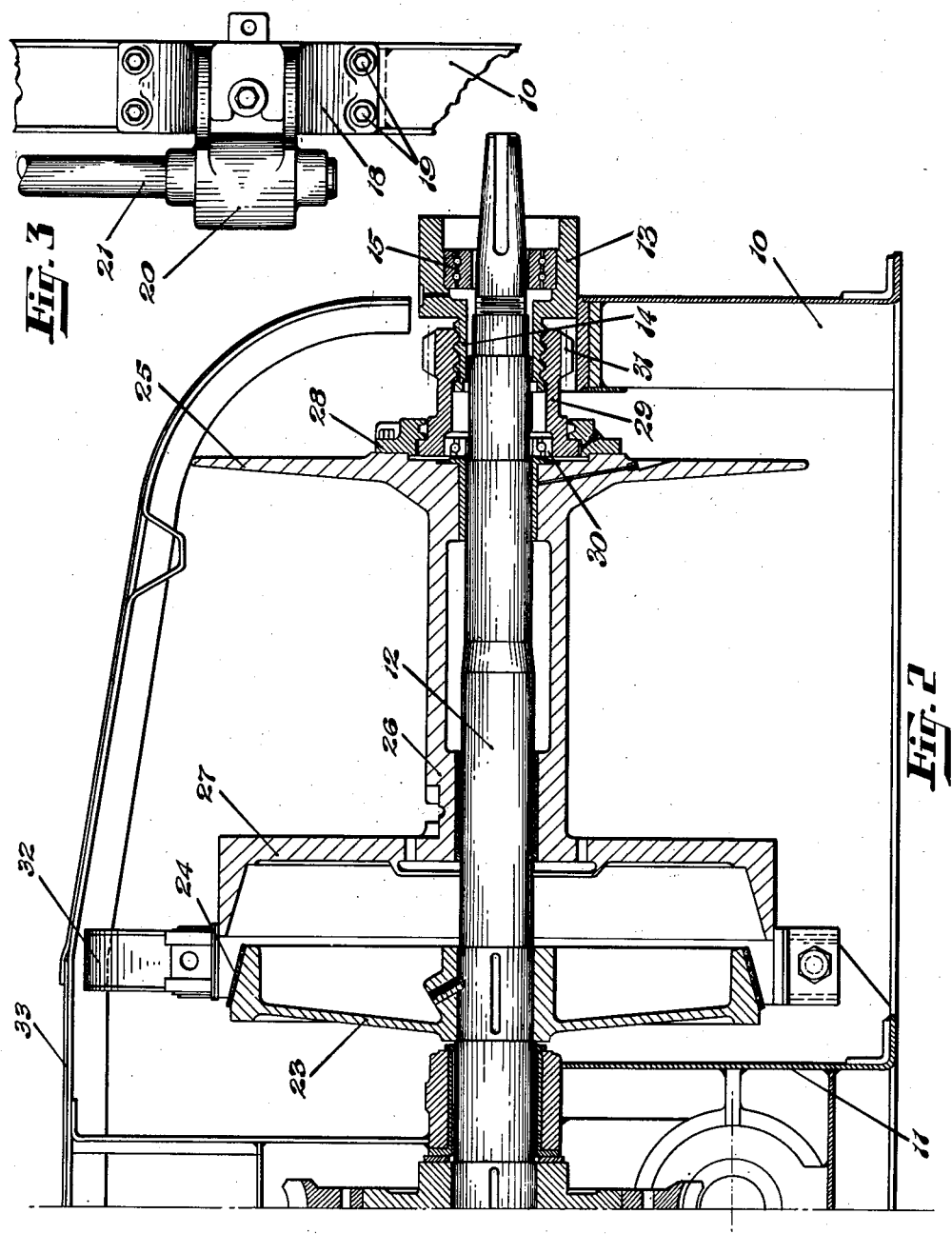

Patented May 2, 1950

2,506,397

UNITED STATES PATENT OFFICE 2,506,397

WINCH WITH FRICTION CLUTCH

Ralph F. Symonds, Marblehead, Mass., assignor to New England Trawler Equipment Co., Chelsea, Mass., a corporation of Massachusetts Application June 19, 1945, Serial No. 600,264

3 Claims. (Cl. 192—94)

This invention relates to winches, more particularly those designed for miscellaneous uses, and consists in improvements in structure which reduce the cost of manufacture and facilitate the proper maintenance of the winch.

Winches of the type disclosed in my prior Patent No. 1,746,060 have been used for many years and have given a high degree of satisfactory service in various fields of use. It has been found, however, that from time to time it is necessary to reline the clutch which is interposed between the driving shaft and the drum. Hitherto, in order to reach the interior of the clutch for any purpose, the winch must be largely disassembled—necessitating a long, tedious, operation which cannot be carried out conveniently on shipboard.

The present invention comprises a new and improved winch construction, whereby the removal of a limited number of relatively small parts permits separation of the clutch members and access to the clutch cone which is to be relined. By this novel construction, not only is the manufacture of the clutch simplified, but the difficulties heretofore encountered are obviated and the operation of relining the clutch reduced to a simple matter which may be accomplished within a few hours, with small tools readily available and if necessary in cramped space wherever the winch may be installed.

These and other advantages incident to my novel construction will be best understood and appreciated from the following description of a preferred embodiment of the invention, selected for purposes of illustration and shown in the accompanying drawings in which:

Fig. 2 is a similar view showing the clutch cones separated for relining, and

Fig. 3 is a fragmentary plan view of the removable cap plate and adjacent parts.

Figure 1:
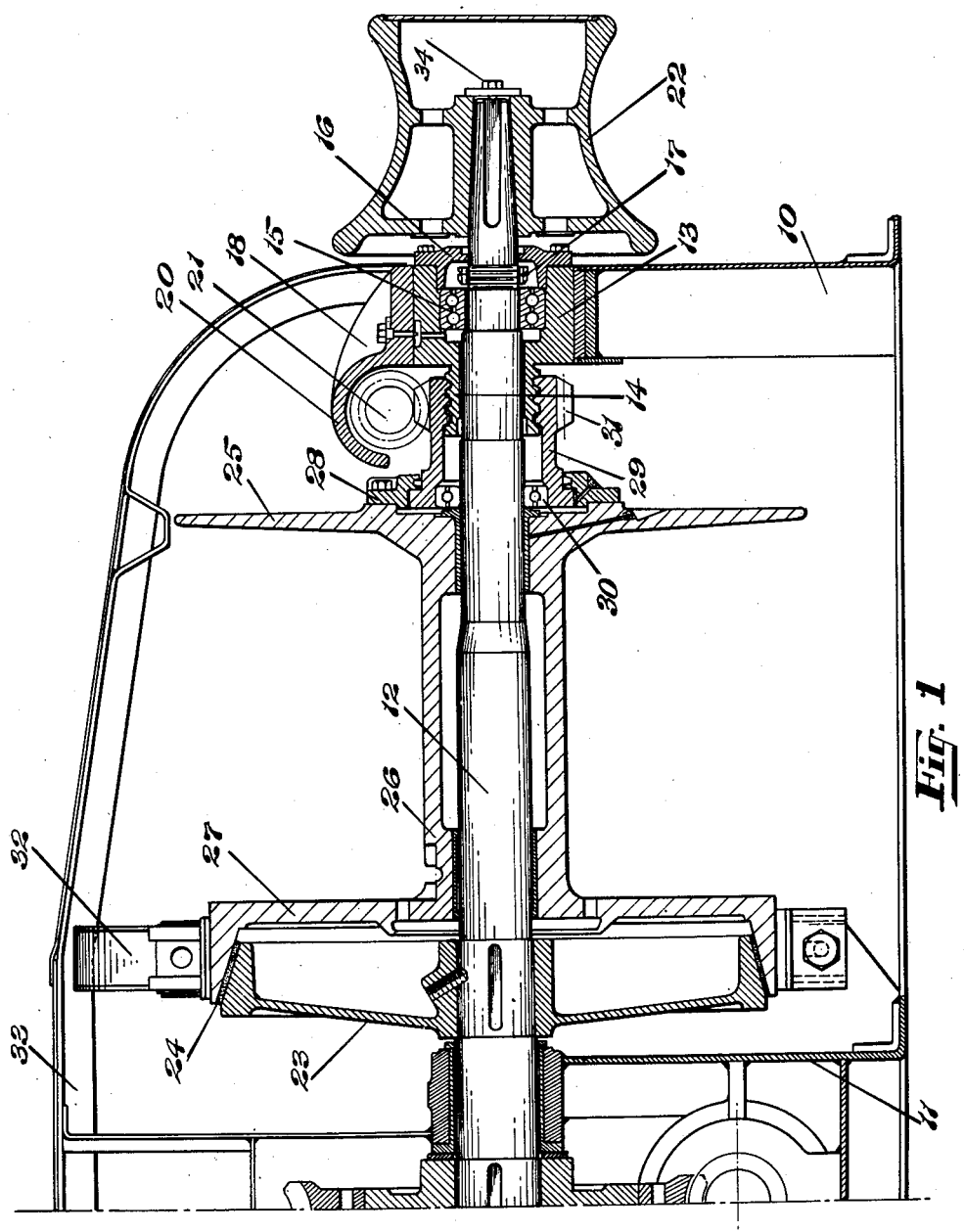
Fig. 1 is a view of one half of the winch in longitudinal section showing the clutch engaged.

The enclosing frame of the winch includes flanged end walls 10, one of which is shown in the drawings, and a central flanged member 11 in which are supported bearings for the main horizontal shaft 12 of the winch. The outboard bearing for the shaft 12 includes a heavy collar or sleeve 13 which normally rests in a semi-circular recess in the end member 10 of the frame. The sleeve 13 is shouldered and provided with an inwardly extending tubular stem 14 of reduced diameter. The sleeve itself is internally recessed in its large diameter outer end to clear the shaft 12 and to provide a chamber for ball bearings 15 by which the shaft is carried within the sleeve.

The ball bearing races are retained in place between an internal shoulder provided in the sleeve 13 and a removable flanged cover plate 16 which as shown in Fig. 1 is bolted to the outer end of the sleeve 13. The shaft is shouldered to receive the inner race of the ball bearings 15 and is threaded to take a pair of lock nuts 17 which rotate with the shaft in the chamber formed by the flange of the cover plate 16.

The supporting sleeve 13 is removably held in place in the frame by a cap plate 18 presenting a semi-circular recess fitting upon the outer large diameter portion of the sleeve 13 and having laterally extending portions which are secured by vertical bolts 19 to the end member 10 of the frame. The cap plate 18 is also extended inwardly to form bearings 20 for a transverse worm shaft 21 which is located above the inner small diameter stem 14 of the bearing sleeve. The worm shaft carries at its outer end a hand wheel and constitutes a part of the mechanism for shifting the loose member of the clutch into and out of engagement. The outer end of the main shaft 12 is tapered to receive the hub of a small hoisting head 22, the latter being keyed to the shaft and held in place by an end plate and a bolt 34.

To the shaft 12 is rigidly secured the cone 23 which constitutes the fast member of the clutch and carries a renewable facing 24 of leather or other friction material. The drum of the winch includes the loose member of the clutch and comprises a flange 25, a hub 26, and an inner flange 27 in which is formed the annular conical clutch surface corresponding to the cone 23. Bolted to the outer face of the flange 25 is an annular plate 28 shouldered to receive the inner flanged end of a sleeve 29. Between the inner end of the flanged sleeve 29 and the shaft 12 are interposed ball bearings 30. Upon the outer end of the sleeve 29 are formed worm teeth 31 which have an external diameter slightly less than that of the sleeve 13 and mesh with a worm on the inner end of the worm shaft 21. There is a threaded connection between the stationary tubular stem 14 of the collar 13 and the sleeve 29 and accordingly when this sleeve is rotated by turning the worm shaft 21 the whole drum is shifted longitudinally upon the shaft 12 and the clutch engaged or disengaged as the case may be. A friction brake band 32 surrounds the circumference of the flange 27 of the drum and this may be operated when the clutch is disengaged to arrest rotation of the drum and to hold it stationary against the pull of the cable passing about it.

The winch is herein shown as partially encased within a housing 33. If it becomes necessary to reline the clutch 23—27, the worn shaft 21 is first turned to move the sleeve 29 endwise toward the right, as seen in Fig. 2, to carry the sleeve outwardly to the limit of its travel. The head 22 is then removed from the end of the shaft. The cover plate 16 and the lock nuts 17 are removed and the cap plate 18 is also unbolted and removed together with the worm shaft 21. Now the sleeve 13 may be pulled outwardly toward the right and, by reason of its threaded connection with the sleeve 29, that sleeve and the entire drum will be displaced toward the right. The sleeve 13 is cylindrical and of uniform diameter so that it is free for outward movement in the frame when released by the removal of the cap plate 18. The stem 14 and the sleeve 29 constitute a tubular connection between the removable bearing sleeve 13 and the drum carrying the loose member 27 of the clutch. The threaded stem 14 is substantially reduced in diameter as compared to the external diameter of the sleeve 13, and the external diameter of the worm teeth 31 on the connecting sleeve 29 is slightly less than that of the outside diameter of the bearing sleeve 13, thus permitting these elements to pass freely into or through the recess in the end member 10 of the frame when released by removal of the cap plate 18. The cone member 23 of the clutch is thus left entirely free of the annular member 27 and remains in unobstructed position wherein the lining 24 may be conveniently removed and replaced with a fresh lining. Subsequently the small parts, removed for this operation, may be replaced and the winch restored to operative position with its relined clutch.

Having thus disclosed my invention, I claim as new and desire to secure by Letters Patent:

1. A winch including in its structure a stationary frame having an end member provided with a recess, bearing sleeve mounted in the recess of said member and having an inwardly projecting tubular stem, a driving shaft rotatable in said sleeve, a clutch mounted at an intermediate point on said shaft and having longitudinally separable members, tubular connections interposed between the stem of said bearing sleeve and the loose member of the clutch, a cap plate for removably securing the bearing sleeve in place in the end member of the frame, ball bearings for the shaft encased within the bearing sleeve and means for removably retaining the ball bearings in place, the bearing sleeve being outwardly movable when released and acting through said tubular connections to displace longitudinally the loose member of the clutch for the purpose of exposing the interior of the clutch.

2. A winch including in its structure a frame, a horizontal shaft therein, a friction clutch located at an intermediate point on the shaft and having a clutch member movable longitudinally on the shaft, a bearing sleeve for the shaft seated in the frame and having an outer large diameter portion and an inwardly extending threaded stem of substantially reduced diameter, a rotatable internally threaded sleeve connected to the stem and to the clutch member and having at one end external worm teeth of less outside diameter than the outer large diameter portion of the bearing sleeve in the frame, and a cap plate holding the bearing sleeve in place in the frame, the internally threaded sleeve being movable endwise into the space vacated by the bearing sleeve when the cap plate and sleeve are removed.

3. A winch including in its structure a frame of rectangular contour having an outer end wall with a semi-circular recess therein, a longitudinally disposed shaft within the frame, a friction clutch located at an intermediate point on the shaft within the frame and having a clutch member movable on the shaft, an outboard bearing sleeve for the shaft comprising a sleeve having an outer cylindrical portion seated in the recess of the end wall and an inwardly extending threaded stem of substantially less diameter than its said cylindrical portion, a rotatable internally threaded sleeve connected to said stem and to the clutch member and having external worm teeth of less overall diameter than the outer cylindrical portion of the bearing sleeve, and a detachable cap plate holding the bearing sleeve in place in the end wall of the frame, the internally threaded sleeve being movable endwise through the space vacated by the bearing sleeve when the cap plate and sleeve are removed.

RALPH F. SYMONDS.

REFERENCES CITED

The following references are of record in the file of this patent:

UNITED STATES PATENTS

| Number | Name | Date |
|---|---|---|
| 1,473,248 | Norris | Nov. 6, 1923 |
| 1,601,742 | Rosendahl | Oct. 5, 1926 |
| 1,609,421 | Norris | Dec. 7, 1926 |
| 1,746,060 | Symonds | Feb. 4, 1930 |
| 2,263,064 | Allin | Nov. 18, 1941 |

FOREIGN PATENTS

| Number | Country | Date |
|---|---|---|
| 262,721 | Great Britain | May 5, 1927 |